(12) United States Patent
Ossian

(10) Patent No.: US 7,122,127 B1
(45) Date of Patent: Oct. 17, 2006

(54) ENVIRONMENTAL FRIENDLY LIQUID ICE MELTER

(75) Inventor: Kenneth C. Ossian, Davenport, IA (US)

(73) Assignee: Ossian, Inc., Davenport, IA (US)

( * ) Notice: Subject to any disclaimer, the term of this patent is extended or adjusted under 35 U.S.C. 154(b) by 0 days.

(21) Appl. No.: 11/324,906

(22) Filed: Jan. 4, 2006

(51) Int. Cl.
*C09K 3/18* (2006.01)

(52) U.S. Cl. .......................................... 252/70; 106/13

(58) Field of Classification Search ................. 252/70; 106/13
See application file for complete search history.

(56) References Cited

U.S. PATENT DOCUMENTS

| | | | | |
|---|---|---|---|---|
| 3,523,798 A | * | 8/1970 | Kail | 426/69 |
| 4,094,805 A | * | 6/1978 | Hansen | 252/70 |
| 4,431,558 A | * | 2/1984 | Wada et al. | 252/70 |
| 5,068,114 A | * | 11/1991 | Chanen et al. | 426/69 |
| 5,599,475 A | * | 2/1997 | Ossian et al. | 252/70 |
| 5,651,915 A | * | 7/1997 | Ossian et al. | 252/70 |
| 5,733,590 A | * | 3/1998 | Holladay | 426/69 |
| 6,605,232 B1 | * | 8/2003 | Montgomery et al. | 252/70 |

FOREIGN PATENT DOCUMENTS

| | | | | |
|---|---|---|---|---|
| DE | 2849810 A | * | 5/1980 |
| JP | 63-97683 A | * | 4/1988 |
| JP | 241624 A | * | 9/1997 |

OTHER PUBLICATIONS

Derwent Abstract No. 2001-463174, abstract of Russian Patent Specification No. 2169751C1 (Jun. 2001).*

* cited by examiner

*Primary Examiner*—Anthony J. Green
(74) *Attorney, Agent, or Firm*—McKee, Voorhees & Sease, P.L.C.

(57) ABSTRACT

A liquid ice melter comprising a calcium chloride solution from 32% to 28% by weight concentration in combination with a urea composition such that the weight ratio of urea to calcium chloride is from 1:2 to 1:9.

5 Claims, No Drawings

ENVIRONMENTAL FRIENDLY LIQUID ICE MELTER

FIELD OF THE INVENTION

This invention relates to de-icing and ice melting compositions for use in preventing or reducing ice and snow accumulation on surfaces. In particular, it relates to liquid ice melting compositions.

BACKGROUND OF THE INVENTION

De-icing compositions are widely used in northern areas of the country, particularly in the northern climates subjected to heavy ice and snow conditions in the winter months. The inventor of the present composition has numerous patents on ice melters. See, for example, U.S. Pat. No. 5,683,619 which relates to a solid ice melting composition which is environmentally friendly. The disclosure of U.S. Pat. No. 5,683,619 is incorporated herein by reference.

A good ice melter for roads, sidewalks, parking lots, etc. is inexpensive, easy to manufacture, effective in melting snow and ice, easy to apply. The best also provide reduced corrosion to application equipment while also having beneficial effects to vegetation. All of these advantages in one ice melter has been a goal of the ice melting industry for some time.

Effective in melting means a product capable of melting below zero F. Ease of application is also important because labor cost is one of the largest components of melting snow and ice. Liquid melters bring ease to the application process.

In my earlier U.S. Pat. No. 5,683,619 (Ossian & Steinhauser), we created a product that melted below zero and could have a positive effect on vegetation. The major disadvantages to this earlier invention were the high cost to produce the product and cost of application. It used calcium chloride and urea in a dry melter composition. When calcium chloride is manufactured for industrial use it starts out as a liquid. The water is then evaporated off to form a flake or pellet. This manufacturing process uses considerable energy adding to the cost of manufacture for the raw material. Some of this cost could be avoided if the ice melter were liquid as finished.

The solid ice melter of U.S. Pat. No. 5,683,619 is advantageous in that it is an effective melter, and it brings a positive effect on vegetation. It is in combination urea and calcium chloride in a solid particle format. In recent times it has been of interest to develop liquid ice melters. In some environments, liquid ice melters are preferred to solid ice melters in that they give better coverage, they are much quicker acting melters, and they are more economical to prepare.

The liquid ice melter of this invention is a product that is less expensive to manufacture, easy to use, melts below zero and can have a positive effect on vegetation. In this invention, I use liquid calcium chloride solution combined with either dry or liquid urea, in critical ratios to achieve an effective liquid ice melter.

In this invention, I add one part urea by weight to calcium chloride ranging from two parts to nine parts by weight, all in a liquid solution. It has similar melting characteristics to straight liquid calcium chloride if the ratios and concentration are correct. In addition, it has reduced corrosion when compared to straight calcium chloride solution. With the final product being liquid in nature, it is easy to apply through standard spray equipment used to normally dispense ice melting liquids.

In accordance with this invention, it is therefore a primary objective to develop a liquid ice melter which contains in predominant proportions calcium chloride solution and urea blended in proper proportions so that it is not only liquid but also environmentally friendly. The result is an effective liquid ice melting composition that can be easily applied using spray tanks, etc. and that forms an effective ice melt cover.

BRIEF SUMMARY OF THE INVENTION

A liquid ice melter comprising a calcium chloride solution from 32% to 28% by weight concentration. This solution is combined with a urea composition such that the weight ratio of urea to calcium chloride is from 1:2 to 1:9. The ideal ratio of urea to calcium is 1:4.5.

DETAILED DESCRIPTION OF THE PREFERRED EMBODIMENT

Liquid calcium chloride at present is available commercially in 42%, 38% and 32% by weight concentrated solutions. Any of these solution strengths or others can be used in the manufacture of this liquid vegetation friendly ice melter. Urea is available in a 46% dry granular or slurry form. Either one of these can be used in the manufacture of this vegetation friendly ice melter. Key steps and components of the process and composition are as follows:
1) Liquid calcium chloride solution;
2) Urea dry slurry solution and blending in proper proportions to achieve effective ice melting and significant corrosion reduction.

The above two components are combined in the following ratios: one part urea added to from two to nine parts calcium chloride (on a dry basis). The ideal range is one part urea to four to five parts calcium chloride.

The liquid ice melter composition of the present invention can comprise other ingredients besides the liquid calcium chloride solution and the urea dry or slurry solution. For example, it may contain reducing sugars as described in U.S. Pat. No. 6,605,232 which is incorporated herein by reference. Those reducing sugars are alkaline degradation products of reducing sugars and can be selected from the group consisting of glucose, fructose, sucrose, galactose, xylose, arobinose, maltose, lactose, ribose and deoxyribose. Generally these reducing sugars are obtained from industrial or agricultural waste streams such as corn steep water and other agricultural business waste water streams. In addition, the composition may contain some of the other ingredients listed in U.S. Pat. No. 5,683,619, including abrasives, surfactants, stabilizers, etc.

The following examples are offered to illustrate but not limit the process of the present invention.

EXAMPLES

For purposes of this example, use a 32% solution of calcium chloride. Add this solution to a mixing vessel, here a 1000 gallons of a 32% solution is added to the mixing vessel. This vessel contains on a dry basis 3,516.8 lbs of calcium chloride based on solution weight of 10.99 lbs per gallon. Urea is available commercially in a 46% granular form. To achieve the desired properties, add 1,699 lbs of commercially available 46% granular urea that would yield 781.5 lbs of urea. The resulting mixture will achieve the ratio of one part urea to 4.5 parts of calcium chloride. After the addition of urea, agitate until the urea is dissolved and mixed into the calcium chloride solution. The original 32% solution of calcium chloride with the addition of the urea will be diluted to approximately 29% solution of calcium chloride.

The eutectic freeze point of a 29% solution of calcium chloride is 53 degrees below zero making it an excellent liquid ice melter. The following combinations of liquid calcium chloride and urea were compared to a 29% solution of liquid calcium chloride for 20 minutes at 30° F., 20° F., 10° F., 0° F., and −10° F.

Solutions tested:

Sample 1. 29% liquid calcium chloride solution

Sample 2. 29% liquid calcium chloride solution plus one part urea to 2 parts calcium chloride Sample 3. 29% liquid calcium chloride solution plus one part urea to 4.5 parts calcium chloride Sample 4. 29% liquid calcium chloride solution plus one part urea to 9 parts calcium chloride Four milliliters of the above solutions were placed on ice prepared by SHRP H-205.2 Standards and tested in a controlled freezer at the above listed temperatures for a period of 20 minutes. The test was repeated four times with the average melted brine solutions listed in Table I in milliliters.

TABLE I

Results follows:

| | +20° F. | +10° F. | 0° F. | −10° F. |
|---|---|---|---|---|
| Sample 1 | 12.78 | 8.95 | 6.05 | 4.8 |
| Sample 2 | 12.75 | 8.7 | 5.78 | 4.43 |
| Sample 3 | 12.9 | 9.1 | 5.9 | 5.0 |
| Sample 4 | 12.45 | 9.05 | 5.85 | 5.15 |

The results indicate the melting values of the liquid calcium chloride plus urea vary little from the straight calcium chloride solution, which is good.

Next, similar calcium chloride and urea ratios were tested for corrosion using ASTM G31, "Standard Practice for Laboratory Immersion Corrosion Testing of Metals". The steel samples were cut from a single piece of steel, measured and weighed and the steel was analyzed chemically with a vacuum optical emission spectrometer following the guidelines of ASTM E415. The samples were immersed for 30 days and then cleaned and re-weighed to determine metal loss.

In this particular study the carbon steel contained no alloying elements that would significantly enhance corrosion resistance properties. It meets the chemical requirements of AISI grade 1008. The samples were cut to rectangular shape of 1"×2" with a hole drilled in them to suspend the sample. The steel is 3/32" thick and the drilled hole is 5/32" diameter. The surface of the steel was ground with 50 grit aluminum oxide grinding paper to eliminate surface oxidation that was present on the samples. This surface oxidation may provide a barrier to chemical attack but is not uniform and therefore is preferably removed for the evaluation of the effect of corrosion on steel surfaces. The samples were cleaned with acetone and then weighed.

The solutions were all maintained at 3% calcium chloride in water with varying amounts of urea added. A 3% percent concentration is chosen because that is typical of ice melt run off after melting occurs on roadways, etc.

Solution #1 has 2 parts calcium chloride to 1 part urea and had Sample #1 immersed in it.

Solution #2 has 4 parts calcium chloride to 1 part urea and had Sample #2 immersed in it.

Solution #3 has 9 parts calcium chloride to 1 part urea and Sample #3 immersed in it.

Solution #4 has only calcium chloride and no urea and had Sample #4 immersed in it.

The samples were suspended with nylon string through the drilled holes in 2 liters of solution. There was no appreciable loss of volume in any of the containers. There was no agitation or aeration of the solutions and the glass containers had lids to prevent evaporation. Since this was an ambient temperature test no controls were employed to adjust the solution temperatures. Solution temperatures varied from 76° to 80° F. with no more than 1° F. difference between containers at any time. The samples were placed in their respective solutions at 1 PM on day one of the test. Visible reddish brown, oxidation products were seen on all samples at 22 hours after initial immersion, most heavily from the drilled hole and the outer edges. By the thirteenth day, all surfaces of all samples show reddish brown oxidation product with no appreciable difference between samples visually. On day twenty seven, samples are all covered with oxidation product and very little difference between samples. The samples were removed from the solutions on day thirty at 1 PM. They were brushed with nonmetallic bristles and acetone to remove adhering corrosion products and then weighed. The weights are presented in the data section. The surfaces were inspected for pitting and irregularities. The corrosion was generally spread over the entire sample with exception that the corners accumulated more corrosion product than the rest of the surface. No pitting was detectable. A corrosion rate in mils per year was calculated for each sample using the rate equation in ASTM G31. This is shown in the data. Using this corrosion rate and the calculation in G31 for determining length of testing (2000/corrosion rate in mpy=hours) in hours, the 30 day (720 hours) time is adequate.

Sample #4 with no urea in the solution had the greatest weight loss. Sample #3 with 9 parts calcium chloride to 1 part urea had the lowest weight loss. Sample #2 with 4 parts calcium chloride to 1 part urea had the second lowest weight loss. Sample #3 with 2 parts calcium chloride to 1 part urea had the third lowest weight loss. This was determined by using the weight loss as a percentage of the original weight. This testing suggests that 3% calcium chloride solutions with urea in them are less corrosive to bare steel surface than a solution with only 3% calcium chloride.

TABLE II

CORROSION TESTS
Data:

| Sample | Original Weight | Final Weight | Weight Loss | Wt. Loss Original Wt. |
|---|---|---|---|---|
| #1 | 23.6016 t | 23.4639 g | 0.1377 g | 0.58343% |
| #2 | 23.8696 g | 23.7337 g | 0.1359 g | 0.56934% |
| #3 | 23.5958 g | 23.4627 g | 0.1331 g | 0.58854% |
| #4 | 23.8214 g | 23.6812 g | 0.1402 g | 0.58854% |

Calculated Corrosion Rate in mils per year using the equation in G31.

Sample #1—2.8672 mpy

Sample #2—2.8297 mpy

Sample #3–2.7714 mpy

Sample #4–2.9192 mpy

The conclusion of the test indicates the addition of urea to a liquid calcium chloride solution will reduce the amount of corrosion. These values could be increased by the addition of additional corrosion inhibitors such as triethanolamine or various sugars (U.S. Pat. No. 6,149,834 to Gall).

The results show that a combination of liquid calcium chloride and urea result in a less expensive ice melter to manufacture, less corrosive, easy to apply, melts below zero and can have a beneficial effect on vegetation. It therefore accomplishes the inventions primary objective.

What is claimed is:

1. A liquid ice melter composition comprising:
   (i) a calcium chloride solution wherein said solution comprises from 28% to 32% by weight of calcium chloride; and
   (ii) urea;
   wherein the weight ratio of urea to calcium chloride solution is within the range of 1:2 to 1:9.

2. The composition of claim 1 wherein the weight percent of calcium chloride is 29%.

3. The composition of claim 2 wherein the weight ratio of urea to the weight percentage of calcium chloride is about 1:4.5.

4. The liquid ice melter composition of claim 1 which includes alkaline degradation products of reducing sugars.

5. The liquid ice melter composition of claim 4 wherein the reducing sugars are selected from the group consisting of glucose, fructose, sucrose, galactose, xylose, arobinose, maltose, lactose, ribose and deoxyribose.

* * * * *

UNITED STATES PATENT AND TRADEMARK OFFICE
CERTIFICATE OF CORRECTION

Page 1 of 1

PATENT NO. : 7,122,127 B1
APPLICATION NO. : 11/324906
DATED : October 17, 2006
INVENTOR(S) : Kenneth C. Ossian It is certified that error appears in the above-identified patent and that said Letters Patent is hereby corrected as shown below:

Col. 6, Claim 1, Line 1:
ADD after chloride --in the--

Signed and Sealed this
Sixteenth Day of August, 2011

David J. Kappos
*Director of the United States Patent and Trademark Office*